United States Patent Office 3,767,624
Patented Oct. 23, 1973

3,767,624
OXAZOLIDINONE MODIFIED EPOXY
NOVOLAC RESIN
James A. Clarke, Lake Jackson, Tex., assignor to The
Dow Chemical Company, Midland, Mich.
No Drawing. Continuation-in-part of abandoned application Ser. No. 48,525, June 22, 1970. This application
Dec. 27, 1971, Ser. No. 212,708
Int. Cl. C08g 5/18
U.S. Cl. 260—59
18 Claims

ABSTRACT OF THE DISCLOSURE

Novel oxazolidinone-modified epoxy novolac resins are disclosed which may be employed to prepared adhesives having excellent properties when exposed to conditions of high humidity.

---

This application is a continuation-in-part of my copending application Ser. No. 48,525, filed June 22, 1970, now abandoned.

This invention relates to novel oxazolidinone modified epoxy novolac resins, cured products thereof, and to adhesives prepared therefrom.

Adhesives based upon epoxy resins are well known and are commonly used in structural applications. However, the ability of such resins to sustain their adhesive properties under conditions of high humidity has limited the usage of epoxy adhesives in this respect.

It has now been discovered that the novel oxazolidinone-modified epoxy novolac resins of the present invention possess a unique property not heretofore attainable from epoxy resins. This unique property is the ability to maintain adhesive properties under high humidity conditions.

Adhesives prepared from the oxazolidinone modified epoxy novolac resins of this invention possess improved tensile shear properties over the corresponding unmodified epoxy novolac resins.

Suitable such epoxy novolac resins which may be modified to contain oxazolidinone groups may be represented by the general formula

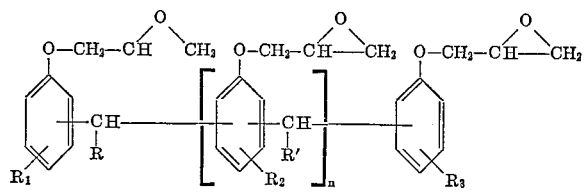

wherein n has an average value of from about 0.5 to about 4 and preferably from about 1 to about 2, R and R' are independently selected from hydrogen and alkyl groups having from about 1 to about 4 carbon atoms and $R_1$, $R_2$ and $R_3$ are independently selected from the group consisting of hydrogen, alkyl groups having from about 1 to about 4 carbon atoms, chlorine and bromine.

The epoxy novolac resins, sometimes referred to as glycidyl ethers of novolac resins, are well known in the art and are generally prepared by reacting a phenolic compound such as, for example, phenol, methyl phenol, tertiary-butyl phenol, bromophenol, mixtures thereof and the like with an aldehyde such as, for example, formaldehyde, acetaldehyde, propionaldehyde, mixtures thereof and the like in the presence of an acidic catalyst such as oxalic acid, sulfuric acid and the like, and reacting the resultant novolac resin with an epihalohydrin and finally dehydrohalogenating such product with a suitable dehydrohalogenation agent such as, for example, sodium hydroxide.

One method of preparation of the oxazolidinone modified epoxy novolac resins of the present invention is to react the epoxy novolac resin with an organic diisocyanate or diisothiocyanate in the presence of a catalyst wherein the ratio of NCO or NCS groups to

groups is in the range of from about 0.1:1 to about 0.5:1 and preferably from about 0.15:1 to about 0.30:1.

When the NCO or NCS to

ratio exceeds about 0.5:1, the products have a tendency to gel and the resins so prepared that do not gel have softening points which are too high for such applications as molding resins; therefore, it is preferred that the NCO or NCS to

ratio be maintained within the above-mentioned ranges.

Suitable catalysts for such reaction include trialkyl amines, alkali metal halides and quaternary ammonium and quaternary phosphonium compounds. In addition cocatalysts such as a primary or secondary monohydric alcohol having from about 1 to about 6 carbon atoms may be employed.

A further and frequently preferred method for the preparation of oxazolidinone modified epoxy novolac resins is to prepare a carbamate by the reaction of an organic diisocyanate with a monohydric alcohol and then to react the resultant carbamate compound with the epoxy novolac resin in the presence of the trialkyl amine, alkali metal halide, quaternary ammonium compound or phosphonium compound. The preparation of the carbamate may take place in the presence of the epoxy novolac resin which serves as a reaction medium for this reaction.

This preferred method is more fully described in my copending application, Ser. No. 48,524 filed June 22, 1970.

Suitable organic diisocyanates and diisothiocyanates which may be employed include, for example, toluene-2,4-diisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenylether;
5,6-dimethyl-1,3-phenylenediisocyanate;
2,4-dimethyl-1,3-phenylenediisocyanate;
4,4'-diisocyanatodiphenylether;
benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6'-dimethyl-4,4'-diisocyanatodiphenyl;
2,4-diisocyanatostilbene;
3,3'-dimethyl-4,4-diisocyanatodiphenyl;
3,3'-dimethoxy-4,4'-diisocyanatodiphenyl;
1,4-anthracenediisocyanate;
2,5-fluorenediisocyanate;
1,8-naphthalenediisocyanate; and
2,6-diisocyanatobenzfuran.

Other suitable isocyanates include the diisocyanates as are described in Canadian Pat. No. 700,026 and in U.S. Pat. No. 2,683,730; the phenyl indane diisocyanates which are described in U.S. Pat. No. 2,855,385, the organic diisocyanates which are described in U.S. Pat. No. 2,292,443.

Still other suitable organic isocyanates include those having an NCO functionality greater than two such as the polymeric polyisocyanates including, for example, polymethylene polyphenylisocyanate.

Also included as useful in preparing the oxazolidinones of this invention are the isothiocyanates which are the sulfur analogs of the above mentioned isocyanates.

The novel oxazolidinone modified epoxy novolac resins of the present invention may be represented by the general formula

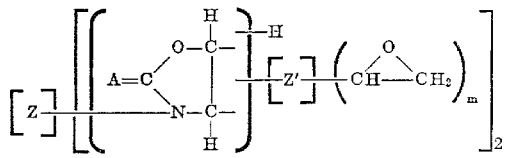

wherein Z is the residue of the organic diisocyanate or organic diisothiocyanate, Z' is the residue of the epoxy novolac resin, A is oxygen or sulfur and $m$ has an average value of from about 1.5 to about 5 and preferably from about 2 to about 3.

Since the ratio of NCO or NCS groups to

employed in the reaction to prepare the novel oxazolidinone resins of the present invention is about 0.5 or less, and the

groups react in a random manner, it is possible for some molecules of the epoxy novolac resin employed to escape reaction with an isocyanate or isothiocyanate group. Thus, the resultant composition may contain minor amounts of unmodified epoxy novolac resin.

In formulating adhesives and other cured products from epoxy resins in general and also the oxazolidinone modified epoxy novolac resins of the present invention, the active ingredients are the epoxy resins and the curing agents therefor. In some instances it is desirable to add other epoxy resins to the adhesive formulation to provide a change in certain properties, such as viscosity, reaction rate, wettability of the surfaces to be bonded, and the like. When this is done, the active ingredients then become a mixture of the oxazolidinone modified epoxy resin, the added epoxy resin and the epoxy curing agent therefor. In addition to the above mentioned active ingredients, adhesive compositions usually contain one or more additives such as fillers, accelerators, thixotroping agents and the like.

Suitable curing agents include dicyandiamide, melamine, guanidines such as acetyl guanidine, methylene dianiline, m-phenylenediamine, BF$_3$ complex with monoethylamine, anhydrides such as tetrahydrophthalic anhydride, dianhydrides such as benzophenonetetracarboxylic dianhydride, and the like.

Suitable fillers include aluminum powder, other metal powders, clays, carbonates, carbon black, silica flour and the like.

Suitable accelerators include tertiary amines such as benzyldimethylamine, dihydroxyphenolics, substituted guanidines, BF$_3$ complex with monoethylamine and the like.

Suitable thixotroping agents include silica aerogels, treated clays, fibrous mineral products such as absestos or microcrystalline silicates and the like.

The novel compositions of the present invention are useful in adhesives, molding compositions, casting compositions, coatings and the like.

The following examples are illustrative of the present invention and are not to be construed as limiting the scope thereof in any manner.

EXAMPLE 1

To a steam jacketed reaction vessel equipped with agitator and means for applying vacuum and a nitrogen purge was charged 25 lbs. of a phenol-formaldehyde epoxy resin having an average functionality of 3.5 and an epoxide equivalent weight of 181. The resin was degassed under vacuum at 120° C. After the vacuum was released, the vessel was purged with nitrogen, the resin was cooled to 60° C., and 0.88 lb. of methanol was added. The methanol-epoxy novolac mixture was then cooled to 55° C. and 2.40 lbs. of an 80/20 mixture by weight of the 2,4- and 2,6-isomers respectively of toluene diisocyanate was added. The temperature was raised to 90° C. and held there at for about 1.5 hours. After adding 11 grams of tetrabutyl phosphonium bromide catalyst, the temperature was raised to 150° C. and maintained there at for about 3.5 hours.

The resultant oxazolidinone modified epoxy resin was a solid product having a Durran's softening point of 78° C. and a percent epoxide of 17.9.

EXAMPLE 2

Adhesive formulations were made from three epoxy resins in order to obtain comparative data as follows.

The epoxy resin employed in adhesive formulation A below was the diglycidyl ether of 4,4'-isopropylidene diphenol having an epoxide equivalent weight of 189.

The epoxy resin employed in adhesive formulation B below was the glycidyl ether of a phenol-formaldehyde novolac having an epoxide functionality of 3.5 and an epoxide equivalent weight of 181.

The epoxy resin employed in adhesive formulation C below was the oxazolidinone modified epoxy novolac resin from Example 1 (epoxide equivalent weight=240).

The adhesive formulations were prepared as follows:

|  | A | | B | | C | |
|---|---|---|---|---|---|---|
|  | Gms. | Parts | Gms. | Parts | Gms. | Parts |
| Epoxy resin | 12.5 | 100 | 12.5 | 100 | 12.5 | 100 |
| Dicyandiamid hardener | 1.00 | 8 | 1.04 | 8.32 | 0.63 | 5.04 |
| Melamine co-hardener | 0.20 | 1.6 | 0.20 | 1.6 | 0.15 | 1.2 |
| Aluminum powder, −150 mesh | 8.0 | 64 | 8.0 | 64 | 8.0 | 64 |
| Cab-o-Sil aerogel | 0.7 | 5.6 | 0.7 | 5.6 | 0.7 | 5.6 |

The formulations were well mixed, degassed and applied to dichromate etched aluminum strips to prepare tensile shear specimens as described in ASTM test D–1002. The assemblies were heat cured at 360° F. for 45 minutes. The average tensile shear strengths of three cured specimens of each formulation, tested at room temperature, were (A) 4300 p.s.i., (B) 2400 p.s.i., and (C) 3120 p.s.i. (average of 3 tests each). Duplicate specimens for each adhesive were then exposed to two different levels each of stress and temperature in a closed system to which water could be added to provide an atmosphere of about 95% relative humidity. The apparatus for these environmental exposure tests is similar to that described in "Adhesives Age" magazine, vol. 12, No. 6, pp. 21–26 (June 1969). The specimens were assembled in strings of six in series (duplicates of each of the three adhesive types). They were exposed at the conditions listed in the table below. When a given sample broke (due to failure at the adhesive glue line) the time was recorded, the sample replaced by a blank strip of metal, and the test continued. Days survival are given in the table.

| Test condition | 80° C., 2,000 p.s.i. | 80° C., 1,500 p.s.i. | 57° C., 2,000 p.s.i. | 57° C., 1,500 p.s.i. |
|---|---|---|---|---|
| Adhesive specimen: | | | | |
| (A): | | | | |
| (1) | 6½ | 10⅞ | 33 | *>81 |
| (2) | 13½ | 16 | 37½ | *>81 |
| Average | 10 | 13 | 35 | |
| (B): | | | | |
| (1) | 13 | 19½ | *>81 | *>81 |
| (2) | 13⅙ | 64 | *>81 | *>81 |
| Average | 13 | 42 | | |
| (C): | | | | |
| (1) | 60 | 60 | *>81 | *>81 |
| (2) | *>81 | 68 | *>81 | *>81 |
| Average | | 64 | | |

*>81 indicates sample had not failed after 81 days.

In all cases, failure of the test specimens appeared to be due to a progressive penetration of moisture into the glue line from all sides and attendant progressive weakening of the stressed chemical bonds due to hydrolytic effects. The scatter in the individual results is typical of that expected for the tensile shear test for adhesives.

The above tests clearly indicate the superiority of the adhesives prepared from the oxazolidinone modified epoxy resins of the present invention.

EXAMPLE 3

(A) An oxazolidinone modified diglycidyl ether of bisphenol A was prepared by the procedure described in Example 1 employing the following:

25 lbs. of D.E.R.® 331 having an epoxide equivalent weight (EEW) of 187–189
2 lbs. of methanol
4.6 lbs. of toluenediisocyanate
11 grams of tetrabutylphosphonium bromide catalyst.

The resultant oxazolidinone modified diglycidylether of bisphenol A had a percent epoxide of 10.1 (EEW=425) and a melting point of 97° C.

An adhesive was prepared from the above prepared oxazolidinone modified epoxy resin employing the following formulation:

| | Parts by weight |
|---|---|
| Resin | 100 |
| Aluminum powder | 70 |
| Cab-O-Sil | 3 |
| Dicyandiamide | 4 |
| Melamine | 1 |

This is designated as Adhesive 3–A.

(B) Another adhesive employing unmodified D.E.R.® 331 having an EEW of 187–189 was prepared employing the following formulation:

| | Parts by weight |
|---|---|
| Resin | 100 |
| Aluminum powder | 70 |
| Cab-O-Sil | 5 |
| Dicyandiamide | 8 |
| Melamine | 2 |

This is designated as Adhesive 3–B.

Aluminum strips measuring 1″ x 4½″ x .020″ were etched and bonded with each of the Adhesives I and II. Quadruplicate samples employing each adhesive were exposed to conditions of 98% relative humidity and 80° C. under 1500 p.s.i. stress. As the samples broke due to humidity attack in the glue line, they were removed and the time recorded.

The following table gives the results of the comparative test.

| Adhesive | Days to failure | | | | |
|---|---|---|---|---|---|
| 3–A | 3⅔ | 4⅓ | 4⅓ | 5⅓ | ¹4½ |
| 3–B | 3⅔ | 4⅔ | 6 | 14 | ¹7.0 |

¹ Average.

The above test clearly indicates that adhesives prepared from an oxazolidinone modified diglycidyl ether of bisphenol A are inferior to adhesives prepared from unmodified diglycidyl ethers of bisphenol A when subjected to like conditions of humidity, temperature, and stress.

EXAMPLE 4

(A) An oxazolidinone modified phenol-formaldehyde epoxy novolac resin was prepared employing the procedure of Example 1 (except for the noted prereaction of the methanol and the toluenediisocyanate) from the following components:

100 grams of epoxy novolac resin having an average functionality of 2.1 (percent epoxide=25.8)
15.7 grams of toluenedimethylurethane (the reaction product of 4.2 grams of methanol and 11.5 grams of toluenediisocyanate)
0.10 gram of tetrabutyl phosphonium acetate·acetic acid complex catalyst (TBPA·HAc).

The resultant oxazolidinone modified epoxy novolac resin had a percent epoxide of 16.8%.

(B) An oxazolidinone modified epoxy novolac resin was prepared from a phenol-formaldehyde epoxy novolac resin having an average functionality of 2.4 and a percent epoxide of 23.9 by the procedure of Example 1 (except for the prereaction of the methanol and toluenediisocyanate) employing the following components:

100.0 grams of epoxy novolac resin
14.55 grams of toluenedimethylurethane (the reaction product of 3.9 grams of methanol and 10.65 grams of toluenediisocyanate)
0.10 gram of TBPA·HAc.

The resultant oxazolidinone modified epoxy novolac resin had a percent epoxide of 17.1.

(C) An oxazolidinone modified epoxy novolac resin was prepared from a mixture of 50% by weight of a phenol-formaldehyde epoxy novolac resin having an average functionality of 2.4 and 50% by weight of a phenol-formaldehyde epoxy novolac resin having an average functionality of 3.5, the resulting mixture having an average functionality of 3.0 and a percent epoxide of 24.0 employing the procedure of Example 1 (except for the prereaction of the methanol and toluenediisocyanate) employing the following components:

100.0 grams of epoxy novolac mixture, 3.0 functional
14.6 grams of toluenedimethylurethane (the reaction product of 3.9 grams of methanol and 10.7 grams of toluenediisocyanate)
0.10 gram of TBPA·HAc.

The resultant oxazolidinone modified epoxy novolac resin had a percent epoxide of 16.4.

(D) An oxazolidinone modified epoxy novolac resin was prepared from a phenol-formaldehyde epoxy novolac resin having an average functionality of 3.5 and a percent epoxide of 23.95 by the procedure of Example 1 employing the following components:

500.0 pounds of 3.5 functional epoxy novolac
26.0 pounds of methanol
53.0 pounds of toluenediisocyanate
228 grams of TBPA·HAc.

The resultant oxazolidinone modified epoxy novolac resin had a percent epoxide of 17.1.

The four unmodified novolac resins employed in the above experiments A, B, C and D as well as the oxazolidinone derivatives thereof were formulated into adhesive compositions. The compositions prepared from the unmodified resins are designated A, B, C and D and the corresponding oxazolidinone modified resins are designated A-M, B-M, C-M and D-M.

Aluminum strips measuring 1" x 4½" x .020" were etched and bonded with each of the adhesives. A ½" overlap bond was made as per ASTM D-1002. Samples of each bonded specimen were exposed to conditions of 98% relative humidity and 80° C. under 2000 p.s.i. stress. As the samples broke due to humidity attack in the glue line, they were removed and the time recorded.

The following table gives the adhesive formulations and the time to failure of the prepared samples.

ratio of from about 0.1:1 to about 0.5:1, said resins being represented by the general formula

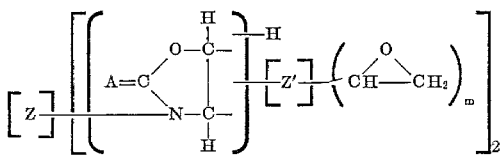

where Z is the residue of said organic polyisocyanate or organic polyisothiocyanate, Z' is the residue of said epoxy novolac resin, A is oxygen or sulfur, and $m$ has an average value of from about 1.5 to about 5.

TABLE I

|  | A | A-M | B | B-M | C | C-M | D | D-M |
| --- | --- | --- | --- | --- | --- | --- | --- | --- |
| Resin, grams | 10 | 10 | 10 | 10 | 10 | 10 | 10 | 10 |
| Aluminum powder, grams | 8 | 8 | 8 | 8 | 8 | 8 | 8 | 8 |
| Cab-O-Sil, grams | .7 | .7 | .7 | .7 | .7 | .7 | .7 | .7 |
| Dicyandiamide, grams | 1.0 | .8 | 1.0 | .8 | 1.0 | .8 | 1.0 | .8 |
| Melamine, grams | 0.2 | 0.15 | 0.2 | 0.15 | 0.2 | 0.15 | 0.2 | 0.15 |
| Time to failure, days | 8 | 6 | 7 | 7.7 | 2.3 | 6.7 | 6 | 8.3 |
| Functionality of resin | 2.1 |  | 2.4 |  | 3.0 |  | 3.5 |  |

The above example demonstrates that adhesives prepared from epoxy novolac resins having a functionality of about 2.5 which are subsequently modified to contain oxazolidinone groups are not significantly affected by humidity, temperature and stress and that when such epoxy novolac resins having a functionality of about 3 and above are modified to contain oxazolidinone groups, adhesives prepared therefrom have improved resistance to temperature, humidity and stress as compared to adhesives prepared from unmodified epoxy novolac resins.

EXAMPLE 5

150 grams of a phenol-formaldehyde epoxy novolac resin having an average functionality of about 3.5 and an epoxide equivalent weight of about 181 was placed in a reaction flask. After degassing under a vacuum at 110° C., the vacuum was broken with nitrogen and .30 gram of tetrabutylphosphonium acetate·acetic acid complex catalyst was added. Then 13.62 grams of the methyl carbamate of polymethylene polyphenylisocyanate was prepared by reacting an excess of methanol to polymethylene polyphenylisocyanate having an average NCO functionality of about 2.8 and an NCO equivalent weight of about 134, in a benzene solution, thereby producing, after recovery from the benzene, a dirty-white solid powder. The epoxy novolac resin-catalyst-carbamate mixture was reacted with stirring at about 180° C. for about 3.5 hours. Infrared analysis revealed that a 97% conversion of the carbamate to the oxazolidinone had occurred. The clear, brown solid product had a Durran's softening point of 78° C. and a percent epoxide of 18.9%. The calculated value for the percent epoxide is 19.9%.

The resin was cured with a stoichiometric quantity of methylene dianiline at 125° C. for about 16 hours and 2 hours at 175° C. The cured product had a heat distortion temperature of 381° F.

I claim:

1. Oxazolidinone modified epoxy novolac resins which are the reaction product of an organic polyisocyanate or organic polyisothiocyanate with an epoxy novolac resin having a functionality of from about 2.5 to about 6 in the presence of a suitable catalyst in quantities so as to provide an

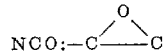

2. An oxazolidinone modified epoxy novolac resin of claim 1 wherein Z' is the residue of an epoxy novolac resin prepared from a phenol-formaldehyde novolac resin having an average functionality of from about 2.5 to about 4.

3. An oxazolidinone modified epoxy novolac resin of claim 2 wherein said novolac resin has an average functionality of from about 3 to about 4.

4. An oxazolidinone modified epoxy novolac resin of claim 3 wherein Z is the residue of an organic diisocyanate.

5. An oxazolidinone modified epoxy novolac resin of claim 4 wherein Z is the residue of toluenediisocyanate.

6. An oxazolidinone modified epoxy novolac resin of claim 3 wherein Z is the residue of an organic polyisocyanate having an average functionality of greater than 2.

7. An oxazolidinone modified epoxy novolac resin of claim 6 wherein Z is the residue of a polymethylene polyphenyl isocyanate.

8. An oxazolidinone modified epoxy novolac resin of claim 7 wherein the polymethylene polyphenylisocyanate has an average functionality of about 3.5.

9. A cured composition resulting from subjecting to curing conditions a composition comprising
   (a) an oxazolidinone modified epoxy resin as defined in claim 1, and
   (b) a curing agent therefor.

10. The cured composition of claim 9 wherein (a) is as defined in claim 4.

11. The cured composition of claim 10 wherein (b) is dicyandiamide.

12. The cured composition of claim 10 wherein (b) is a mixture of dicyandiamide and melamine.

13. The cured composition of claim 9 wherein (a) is as defined in claim 6.

14. An adhesive composition comprising, as the active ingredients,
   (a) an oxazolidinone modified epoxy resin as defined in claim 1, and
   (b) a curing agent therefor.

15. An adhesive composition of claim 14 wherein (a) is as defined in claim 4.

16. An adhesive composition of claim 14 wherein (a) is as defined in claim 5.

17. An adhesive composition of claim 16 wherein (b) is dicyandiamide.

18. An adhesive composition of claim 16 wherein (b) is a mixture of dicyandiamide and melamine.

References Cited

UNITED STATES PATENTS

| | | | |
|---|---|---|---|
| 2,637,715 | 5/1953 | Ott | 260—32-8 |
| 2,829,984 | 4/1958 | Yaeger | 260—47 X |
| 3,020,262 | 2/1962 | Speranza | 260—47 |
| 3,313,747 | 4/1967 | Schramm | 260—75 X |
| 3,334,110 | 8/1967 | Schramm | 260—307 |
| 3,391,113 | 7/1968 | Lopez et al. | 260—47 |
| 3,413,377 | 11/1968 | Schramm et al. | 260—47 X |
| 3,415,901 | 12/1968 | Schramm et al. | 260—830 |

OTHER REFERENCES

Epoxy Resins, Lee et al., 1957, p. 3.
Handbook of Epoxy Resins, pp. 2-10—2-12, 4-59, 4-61, Lee et al., 1967.

HOWARD E. SCHAIN, Primary Examiner

U.S. Cl. X.R.

161—215; 260—38

UNITED STATES PATENT OFFICE
CERTIFICATE OF CORRECTION

PO-1050 (5/69)

Patent No. 3,767,624　　　　　　　Dated October 23, 1973

Inventor(s) James A. Clarke

It is certified that error appears in the above-identified patent and that said Letters Patent are hereby corrected as shown below:

Col. 1, l. 14, change "prepared" to --prepare--.

Col. 5, l. 9, change "6 1/2" to --6 1/3--.

Signed and sealed this 5th day of November 1974.

(SEAL)
Attest:

McCOY M. GIBSON JR.　　　　　　　C. MARSHALL DANN
Attesting Officer　　　　　　　　Commissioner of Patents